United States Patent
Kolding et al.

(10) Patent No.: US 12,028,862 B2
(45) Date of Patent: Jul. 2, 2024

(54) MULTI-QoS-LEVEL UPLINK GRANT AND LCG CONTROL PROCESS

(71) Applicant: Nokia Technologies Oy, Espoo (FI)

(72) Inventors: Troels Kolding, Klarup (DK); Daniela Laselva, Klarup (DK); Frank Frederiksen, Klarup (DK); Istvan Kovacs, Aalborg (DK); Jeroen Wigard, Klarup (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/650,257

(22) PCT Filed: Sep. 21, 2018

(86) PCT No.: PCT/FI2018/050682
§ 371 (c)(1),
(2) Date: Mar. 24, 2020

(87) PCT Pub. No.: WO2019/063879
PCT Pub. Date: Apr. 4, 2019

(65) Prior Publication Data
US 2020/0314888 A1 Oct. 1, 2020

Related U.S. Application Data

(60) Provisional application No. 62/565,888, filed on Sep. 29, 2017.

(51) Int. Cl.
*H04W 72/23* (2023.01)
*H04W 72/1268* (2023.01)

(52) U.S. Cl.
CPC ....... *H04W 72/23* (2023.01); *H04W 72/1268* (2013.01)

(58) Field of Classification Search
CPC ......... H04W 72/1268; H04W 72/1284; H04W 72/1289; H04W 72/1294; H04W 72/14; H04W 74/004
See application file for complete search history.

(56) References Cited

U.S. PATENT DOCUMENTS

| | | | | |
|---|---|---|---|---|
| 2009/0073922 | A1* | 3/2009 | Malladi | H04L 1/1664 370/328 |
| 2009/0196175 | A1* | 8/2009 | Sammour | H04W 36/02 370/230.1 |

(Continued)

FOREIGN PATENT DOCUMENTS

| | | | | |
|---|---|---|---|---|
| EP | 2343946 A2 * | 7/2011 | | H04L 5/001 |
| WO | 2017/039283 A1 | 3/2017 | | |
| WO | 2017/164668 A1 | 9/2017 | | |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321, V14.3.0, Jun. 2017, pp. 1-107.

(Continued)

*Primary Examiner* — Dinh Nguyen
(74) *Attorney, Agent, or Firm* — Harrington & Smith

(57) ABSTRACT

Certain embodiments may relate to communication systems, and, for example, some embodiments may relate to multi-QoS level uplink grants. According to a first embodiment, a method may include transmitting, by a first network entity, one or more grants of one or more uplink resources to a second network entity. The one or more grants of one or more uplink resources includes one or more physical resource allocation parameters containing one or more logical channel groups. The method may further include receiv- (Continued)

ing, by the first network entity, data from the second network entity allocated according to the one or more logical channel groups.

20 Claims, 6 Drawing Sheets

(56) References Cited

U.S. PATENT DOCUMENTS

| | | | | |
|---|---|---|---|---|
| 2010/0046456 A1* | 2/2010 | Yi | ......................... | H04W 72/10 370/329 |
| 2010/0281486 A1* | 11/2010 | Lu | ..................... | H04W 72/1247 718/104 |
| 2011/0310833 A1* | 12/2011 | Lee | ....................... | H04L 1/1829 370/329 |
| 2012/0033624 A1* | 2/2012 | Luo | ......................... | H04L 5/001 370/329 |
| 2012/0039263 A1* | 2/2012 | Moberg | ............ | H04W 72/1284 370/329 |
| 2013/0016615 A1* | 1/2013 | Shi | .................... | H04W 72/1284 370/241 |
| 2016/0157256 A1 | 6/2016 | Tseng | ................................ | 72/12 |
| 2016/0227564 A1 | 8/2016 | Stephenne et al. | | |
| 2017/0013610 A1 | 1/2017 | Lee et al. | ........................ | 72/413 |
| 2017/0257876 A1* | 9/2017 | Loehr | .................. | H04L 5/0044 |
| 2017/0257883 A1 | 9/2017 | Bessho | ............................. | 72/14 |
| 2017/0310531 A1* | 10/2017 | Dinan | ..................... | H04L 27/32 |
| 2018/0124811 A1* | 5/2018 | Yi | ........................ | H04W 28/22 |
| 2018/0270839 A1* | 9/2018 | Loehr | ............... | H04W 72/0446 |
| 2019/0182853 A1* | 6/2019 | Yi | ........................ | H04L 1/1812 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.3.0, Jun. 2017, pp. 1-331.

"3rd Generation Partnership Project; Technical Specification Group Radio Access Network; Evolved Universal Terrestrial Radio Access (E-UTRA); Multiplexing and channel coding (Release 14)", 3GPP TS 36.212 V14.3.0, Jun. 2017, pp. 1-198.

"Stage 2 TP for LCP", 3GPP TSG-RAN WG2 #99, R2-1709829, Agenda: 10.2.1 (Stage 2 TSs and running CR), Fujitsu, Aug. 21-25, 2017, pp. 1-2.

"UL Grant and MAC PDU Construction", 3GPP TSG-RAN WG2 NR Ad Hoc, R2-1700285, Agenda: 3.2.1.4 (FS_NR_newRAT), LG Electronics Inc, Jan. 17-19, 2017, pp. 1-2.

International Search Report and Written Opinion received for corresponding Patent Cooperation Treaty Application No. PCT/FI2018/050682, dated Dec. 7, 2018, 22 pages.

"Logical Channel Prioritization with Multiple Numerologies for NR", 3GPP TSG-RAN WG2 #97, R2-1701185, Agenda: 10.2.1.4, InterDigital Communications, Feb. 13-17, 2017, pp. 1-3.

"Logical Channel Prioritization for NR", 3GPP TSG-RAN WG2 #97bis, R2-1702871, Agenda: 10.3.1.5, InterDigital Communications, Apr. 3-7, 2017, pp. 1-4.

"Remaining Issues on LCP With Multiple Numerologies", 3GPP TSG-RAN WG2 #98, R2-1705624, Agenda: 10.3.1.6, Huawei, May 15-19, 2017, 3 pages.

"BSR Enhancements With Multiple Numerologies", 3GPP TSG-RAN WG2 AdHoc, R2-1706901, Agenda: 10.3.1.6, Huawei, May 27-29, 2017, 3 pages.

Office action received for corresponding Korean Patent Application No. 2020-7012345, dated Apr. 12, 2021, 6 pages of office action and 2 pages of Translation available.

"Uplink dynamic scheduling in NR", Ericsson, 3GPP TSG-RAN WG2 #97, R2-1700838, Feb. 2017, 5 pages.

"The impact of duplication on MAC", OPPO, 3GPP TSG RAN WG2#NR_AdHoc#2, R2-1706344, Jun. 2017, 3 pages.

\* cited by examiner

Figure 2

| Uplink Grant ID | Uplink Grant Type | LCG1 (critical service, guaranteed latency and reliability) | LCG2 (guaranteed latency service, medium reliability target) | LCG3 (best effort service, minimum BR1) | LCG4 (best effort service, minimum BR2) |
|---|---|---|---|---|---|
| 0 | Low latency, high reliability, low spectral eficiency | Yes (e.g., according to Priority1, PBR1a=Infinite, MBR1) | Yes (e.g., according to Priority2, PBR2a=Infinite, MBR2) | Yes (e.g., according to Priority3, PBR3a, MBR3) | Yes (e.g., according to Priority4, PBR4a, MBR4) |
| 1 | Medium latency, medium reliability, medium spectral efficiency | No - cannot use this grant | Yes (e.g., according to Priority2, PBR2b=Infinite, MBR2) | Yes (e.g., according to Priority3, PBR3b, MBR3) | Yes (e.g., according to Priority4, PBR4b, MBR4) |
| 2 | High latency, low reliability, high spectral efficiency | No - cannot use this grant | No - cannot use this grant | Yes (e.g., according to Priority3, PBR3c, MBR3) | Yes (e.g., according to Priority4, PBR4c, MBR4) |

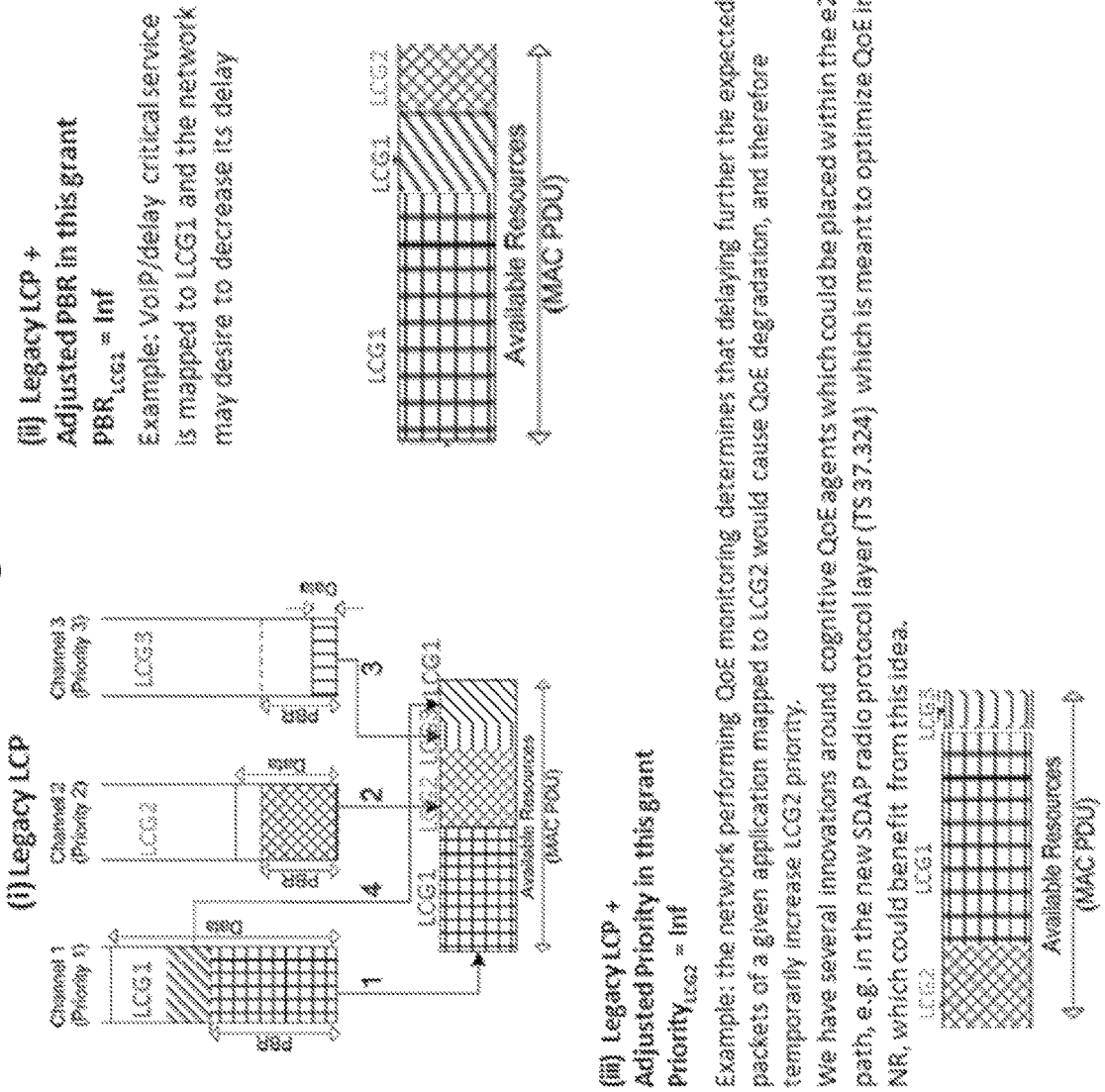

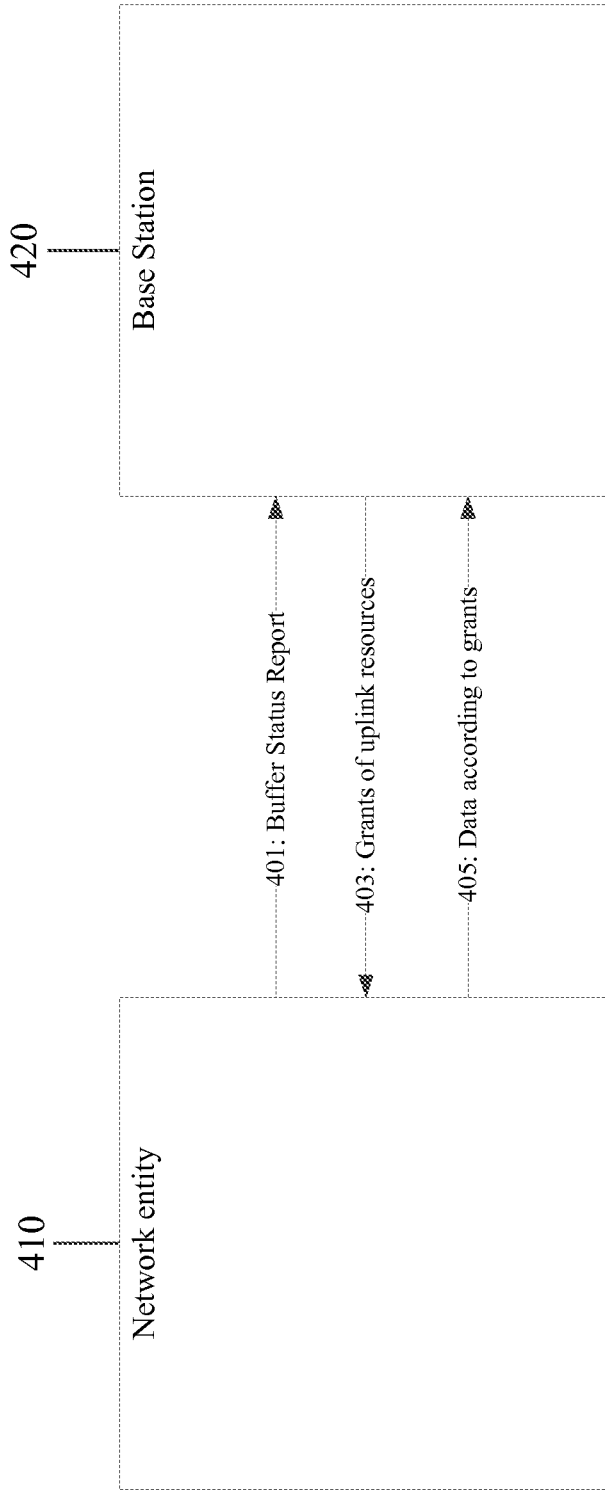

MULTI-QoS-LEVEL UPLINK GRANT AND LCG CONTROL PROCESS

RELATED APPLICATION

This application claims priority to PCT Application No. PCT/FI2018/050682, filed on 21 Sep. 2018, which claims priority from U.S. Provisional Application No. 62/565,888, filed on 29 Sep. 2017 each of which is incorporated herein by reference in its entirety.

BACKGROUND

Field

Certain embodiments may relate to communication systems involving various configurations of logical channel groups. In particular, instructions may be provided by a base station to a network entity in the form of a grant that provides various parameters for one or more logical channel groups. The network entity may then provide data based upon the received one or more logical channel groups.

Description of the Related Art

In a communication system, such as a Long-Term Evolution (LTE) network, 5th generation (5G) mobile network, or any other next-generation network system, uplink scheduling and Quality of Service (QoS) management may be used to control resources utilized by a radio bearer. In particular, in a network entity, such as user equipment, a L2/MAC buffer may contain various types of data that require various levels of QoS, such as URLLC and best effort (BE).

In such a communication system, an evolved Node B (eNB) may be responsible for management of all uplink QoS, and may use data provided by network entities related to the amount of data buffered for transmission to the eNB. The network entities may report to the eNB regarding which radio bearers (RBs) require which uplink resources and the amount of resources needed. The network entity may report this information through a buffer status report (BSR). After receiving a BSR, the eNB may schedule uplink resources to each network entity based upon the QoS characteristics of each corresponding RB and the buffer status contained in the BSR.

If a network entity is connected to one or more packet data networks (PDNs), such as an IP Multimedia Subsystem (IMS), Internet, and/or a Virtual Private Network (VPN), the network entity may have several RBs configured, in addition to the Radio Resource Control (RRC) signaling bearers (SRBs). In order to avoid network entities utilizing resources to keep an eNB informed of the number of radio bearers, Logical Channel Groups (LCGs) may be used. LCGs may be used to map any one of the radio bearers to one or more of a plurality of LCGs. The mapping of a radio bearer (or logical channel) to a LCG is performed during radio bearer setup, based upon the QoS attributes corresponding to that radio bearer, such as QoS Class Identifier (QCI).

A Buffer Status Report (BSR) may be triggered in at least four ways. First, a BSR may be triggered when new data arrives in previously empty buffers. During the beginning of an uplink data transmission, data buffers may be empty. If data later becomes available for transmission in any radio bearer in the network entity, a BSR may be triggered. Second, if the network entity has already sent a BSR and is waiting for the base station to respond with a grant, but higher priority data becomes available for transmission before the grant has been received, the network entity will inform the base station of this new higher priority data with a BSR. In some embodiments, this updated BSR may be sent even when a triggering RB is in the same LCG for which there is an outstanding BSR.

Third, a BSR may be triggered to update the base station on the status of RBs. For example, if the network entity is uploading a file, the data received in the network entity transmission buffer is received asynchronously with respect to the grants that it receives from the base station. As a result, there is a continuous need to keep a base station informed as to the amount of data that still needs to be transmitted. In some embodiments, the network entity may include a timer and/or trigger a BSR when the timer expires. The timer may be configured by the RRC, and/or range from 5 ms to 2.56 seconds. The timer may be disabled by setting the timer to infinity, which is also the default.

Fourth, a BSR may be triggered to provide BSR robustness. For example, in order to avoid deadlock situations where a network entity sends a BSR but never receives a grant, a BSR retransmission mechanism may be used to retransmit BSRs from the network entity. The network entity may track a timer, such as a retxBSR-Timer, which begins when a BSR is sent from the network entity and is stopped when a grant is received. However, if the timer expires while the network entity still has data available for transmission, a new BSR may be triggered. The retransmission timer, configured by the RRC, may range from 320 ms up to 10.24 seconds. Unlike the periodic timer, it may not be disabled by setting to infinity, and has a default value of 2.56 seconds.

When a cell in the eNB schedules uplink data, it provides an allocation to a network entity, which is then processed in the network entity through logical channel prioritization (LCP). During a LCP procedure, RRC may control the scheduling of uplink data by giving each logical channel a priority where increasing priority values indicate lower priority levels. In addition, each logical channel may be provided with a Prioritized Bit Rate (PBR). Furthermore, a Maximum Bit Rate (MBR) may also be provided. The LCP procedure ensures that the network entity serves the logical channels in a decreasing priority order up to their configured PBR, and for any resources that remain, all of the logical channels are served in a strict decreasing priority order up to their configured MBR.

SUMMARY

In accordance with some embodiments, a method may include receiving, by a first network entity from a second network entity, one or more buffer status reports related to buffered data. The method may further include transmitting, by the first network entity, one or more grants of one or more uplink resources to the second network entity. The one or more grants of one or more uplink resources may include one or more physical resource allocation parameters that the second network entity may utilize for one or more logical channel groups targeted for the one or more grants. The method may further include receiving, by the first network entity, data from the second network entity allocated from the one or more logical channel groups.

In accordance with some embodiments, an apparatus may include means for receiving one or more buffer status reports related to buffered data. The apparatus may further include means for transmitting one or more grants of one or more uplink resources to the second network entity. The one or more grants of one or more uplink resources may include one or more physical resource allocation parameters that the second network entity may utilize for one or more logical channel groups targeted for the one or more grants. The apparatus may further include means for receiving data from the second network entity allocated from the one or more logical channel groups.

In accordance with some embodiments, an apparatus may include at least one processor and at least one memory including computer program code. The at least one memory and the computer program code can be configured to, with the at least one processor, cause the apparatus to at least receive one or more buffer status reports related to buffered data. The at least one memory and the computer program code can be further configured to, with the at least one processor, cause the apparatus to at least transmit one or more grants of one or more uplink resources to the second network entity. The one or more grants of one or more uplink resources may include one or more physical resource allocation parameters that the second network entity may utilize for one or more logical channel groups targeted for the one or more grants. The at least one memory and the computer program code can be further configured to, with the at least one processor, cause the apparatus to at least receive data from the second network entity allocated from the one or more logical channel groups.

In accordance with some embodiments, a non-transitory computer readable medium can be encoded with instructions that may, when executed in hardware, perform a method. The method may receive one or more buffer status reports related to buffered data. The method may further transmit one or more grants of one or more uplink resources to the second network entity. The one or more grants of one or more uplink resources may include one or more physical resource allocation parameters that the second network entity may utilize for one or more logical channel groups targeted for the one or more grants. The method may further receive data from the second network entity allocated from the one or more logical channel groups.

In accordance with some embodiments, a computer program product may perform a method. The method may receive one or more buffer status reports related to buffered data. The method may further transmit one or more grants of one or more uplink resources to the second network entity. The one or more grants of one or more uplink resources may include one or more physical resource allocation parameters that the second network entity may utilize for one or more logical channel groups targeted for the one or more grants. The method may further receive data from the second network entity allocated from the one or more logical channel groups.

In accordance with some embodiments, an apparatus may include circuitry configured to receive one or more buffer status reports related to buffered data. The circuitry may further transmit one or more grants of one or more uplink resources to the second network entity. The one or more grants of one or more uplink resources may include one or more physical resource allocation parameters that the second network entity may utilize for one or more logical channel groups targeted for the one or more grants. The circuitry may further receive data from the second network entity allocated from the one or more logical channel groups.

In accordance with some embodiments, a method may include transmitting, by a first network entity, one or more buffer status reports related to resource usage to a second network entity. The method may further include receiving one or more grants of one or more uplink resources includes one or more physical resource allocation parameters containing one or more logical channel groups. The method may further include transmitting, by the first network entity, data to the second network entity allocated from the one or more logical channel groups.

In accordance with some embodiments, an apparatus may include means for transmitting one or more buffer status reports related to resource usage to a second network entity. The apparatus may further include means for receiving one or more grants of one or more uplink resources includes one or more physical resource allocation parameters containing one or more logical channel groups. The apparatus may further include means for transmitting data to the second network entity allocated from the one or more logical channel groups.

In accordance with some embodiments, an apparatus may include at least one processor and at least one memory including computer program code. The at least one memory and the computer program code can be configured to, with the at least one processor, cause the apparatus to at least transmit one or more buffer status reports related to resource usage to a second network entity. The at least one memory and the computer program code can be further configured to, with the at least one processor, cause the apparatus to at least receive one or more grants of one or more uplink resources includes one or more physical resource allocation parameters containing one or more logical channel groups. The at least one memory and the computer program code can be further configured to, with the at least one processor, cause the apparatus to at least transmit data to the second network entity allocated from the one or more logical channel groups.

In accordance with some embodiments, a non-transitory computer readable medium can be encoded with instructions that may, when executed in hardware, perform a method. The method may transmit one or more buffer status reports related to resource usage to a second network entity. The method may further receive one or more grants of one or more uplink resources includes one or more physical resource allocation parameters containing one or more logical channel groups. The method may further transmit data to the second network entity allocated from the one or more logical channel groups.

In accordance with some embodiments, a computer program product may perform a method. The method may transmit one or more buffer status reports related to resource usage to a second network entity. The method may further receive one or more grants of one or more uplink resources includes one or more physical resource allocation parameters containing one or more logical channel groups. The method may further transmit data to the second network entity allocated from the one or more logical channel groups.

In accordance with some embodiments, an apparatus may include circuitry configured to transmit one or more buffer status reports related to resource usage to a second network entity. The circuitry may further receive one or more grants of one or more uplink resources includes one or more physical resource allocation parameters containing one or more logical channel groups. The circuitry may further transmit data to the second network entity allocated from the one or more logical channel groups.

BRIEF DESCRIPTION OF THE DRAWINGS

For proper understanding of this disclosure, reference should be made to the accompanying drawings, wherein:

FIG. 2 illustrates an example of logical control groups according to certain embodiments.

FIG. 3 illustrates an example of how a network entity fills a given grant using PBR/priority parameters associated to an LCG dynamically set on a per grant basis according to certain embodiments.

FIG. 4 illustrates an example of a signaling diagram according to certain embodiments.

DETAILED DESCRIPTION

Figure 1:
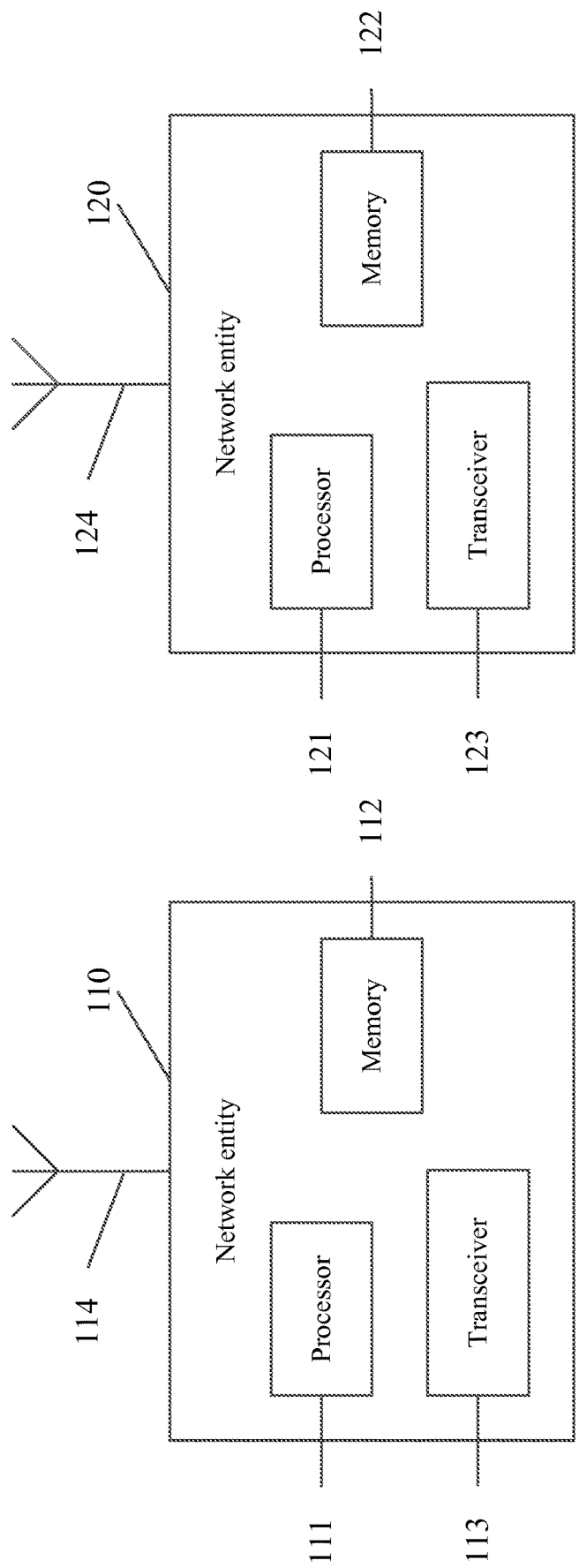
FIG. 1 illustrates a system according to certain embodiments.

The features, structures, or characteristics of certain embodiments described throughout this specification may be combined in any suitable manner in one or more embodiments. For example, the usage of the phrases "certain embodiments," "some embodiments," "other embodiments," or other similar language throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language throughout this specification does not necessarily refer to the same group of embodiments, and the described features, structures, or characteristics may be combined in any suitable manner in one or more embodiments.

When a network entity reports buffered uplink data ready to be transmitted belonging to services with varying Quality of Service (QoS) requirements, the network may allocate only one Modulation and Coding Scheme (MCS) per grant to the network entity. For example, when a network entity has buffered data for a URLLC service, which requires high reliability and low latency, and a second service, such as best effort (BE). In order to ensure the high reliable low latency service's requirement, a very robust MCS for the transmission is likely allocated by the network (i.e., targeting a very low residual for even first transmission BLER for LCG). If there is not enough data in the buffer for LCG, the same grant will be used additionally for transmitting data of the best effort (BE) service. In turn, this leads to much lower spectral efficiency than what would be achieved if the grant was tailored specifically to a service. Thus, a network entity using a grant with data from multiple services with various different QoS requirements will degrade uplink radio performance since there is only one uplink allocation per network entity.

Certain embodiments contained herein may provide significant technical advantages. For example, certain embodiments may reduce the overall resources utilized by entities by avoiding unnecessary use of network resources. Specifically, certain embodiments avoid requiring a network entity from keeping an eNB informed of the status of a large number of radio bearers. Such a reduction in the overall resources may allow the network to dedicate the saved resources to other transmissions or network entities, thus improving overall network performance and utilization.

Certain embodiments relate to grants including multiple Quality of Services (QoS) types for uplink scheduling. In some embodiments, each grant may associated with one or more settings to optimize one or more performance metrics associated with one or more services associated with one or more different QoS service levels, which are associated with the one or more Logical Channel Group (LCG) configurations. Each grant provides one or more dynamic scheduling rules for how an LCG uses a certain grant type and/or whether the grant type can be used. In some embodiments, a grant type may be restricted to only one or more LCGs of the available LCGs. In other embodiments, a grant type may be configured for a LCG despite having insufficient data to fill out the grant. For example, a grant type may be configured for a LCG when it would be preferable to send useful data than zero padding.

FIG. 1 illustrates a system according to certain embodiments. In one embodiment, a system may include multiple devices, for example, network entity 110 and network entity 120. Network entity 110 may include one or more of user equipment, a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof. Network entity 120 may include one or more of a base station, such as an evolved node B (eNB) or next generation node B (gNB), a next generation radio access network (NG RAN), a mobility management entity (MME), a serving gateway, a server, and/or any other access node or combination thereof.

One or more of entities 110 and 120 may include at least one processor, respectively indicated as 111 and 121. At least one memory may be provided in one or more of entities 110 and 120, indicated at 112 and 122, respectively. Memory 112, 122 may be fixed and/or removable. Memory 112, 122 may include computer program instructions or computer code contained therein. Processors 111, 121 and memories 112, 122, or a subset thereof, may be configured to provide means corresponding to the various blocks of FIGS. 2-6. Although not shown, one or more of entities 110 and 120 may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, altimeters, compasses, and the like.

As shown in FIG. 1, transceivers 113 and 123 may be provided, and one or more transceivers may include at least one antenna, respectively illustrated as 114 and 124. The devices may have many antennas, such as an array of antennas configured for multiple input multiple output (MIMO) communications, or multiple antennas for multiple radio access technologies. Other configurations of these devices, for example, may be provided.

Transceivers 113 and 123 may be a transmitter, a receiver, both a transmitter and a receiver, or a unit or device that may be configured both for transmission and reception.

Processors 111 and 121 may be embodied by any computational or data processing device, such as a central processing unit (CPU), application specific integrated circuit (ASIC), or comparable device. The processors may be implemented as a single controller, or a plurality of controllers or processors. In addition, the processors may be general purpose or special purpose processors.

Memory 112 and 122 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language.

The memory and the computer program instructions may be configured, with the processor for the particular device, to cause a hardware apparatus, such as user equipment, an eNB, or a gNB, to perform any of the processes described below (see, for example, FIGS. 2-6). Therefore, in certain embodiments, a non-transitory computer-readable medium may be encoded with computer instructions that, when executed in hardware, perform a process such as one of the processes described herein. Alternatively, certain embodiments may be performed entirely in hardware.

According to some embodiments, a base station generates and transmits one or more grants with physical (PHY) allocation parameters, such as Modulation and Coding Scheme (MCS), tailored for certain LCGs to a particular network entity, such as user equipment. The user equipment then uses the grant to only use those LCGs described in the grant for upload transmission. The resulting transmissions avoid different LCGs (URLLC versus eMBB) being scheduled in the same grant, decreasing the efficiency of the link and overall network.

Furthermore, the base station may generate and transmit one or more grants prioritizing certain LCGs in a given grant, and the network entity may use the grant to schedule data according to dynamic rules, allowing the network entity to prioritize certain LCGs and optimize QoS/QoE.

In the first embodiment, the base station may transmit one or more grants with different Block Error Ratio (BLER) targets to different LCGs with different QoS requirements. For example, a high BLER (for example, 20% BLER target and 16 quadrature amplitude modulation (QAM) rate of 0.8) may be associated with an eMBB, while a low BLER may be associated with a URLLC. The determination on whether to generate and send a grant tailored for a given LCG (or set of LCGs) in a given Transmission Time Interval (TTI) may be based on the BSR report from the network entity indicating the level of data buffered for each LCG, and/or whether particular traffic meets or fails to meet QoS/QoE targets, such as whether the latency of a group of packets is approaching the latency target.

For example, FIG. 2 summarizes the types of grants that a base station may generate and send to a network entity. Three different grants types may be sent, each associated with various parameters in relation to each of several LCGs. Grant ID 0 is a less spectrally efficient grant that supports critical services (e.g., uses very conservative and robust MCS which ensures lower BLER targets) and is intended to be used by the network entity for data traffic requiring low-latency and high-reliability. For this type of requirement, LCG1 may be utilized, which may include URLLC. For LCG1, Prioritized Bit Rate (PBR)1a may be set to infinity, and the LCG1 traffic buffer may be fully utilized before any other LCG is allocated to this buffer. The grant may also include Grant IDs 1 and 2, which may be used for less demanding services with decreased reliability and latency to improve spectral efficiency of the network and network entity-base station link. In some embodiments, grants IDs 1 and/or 2 may be barred from using certain LCGs for critical data transmission. For example, LCG1 is only permitted to be used in Grant ID 1. In certain embodiments, the grants may be arranged so that two network entity grants may use the same reliability, latency, and spectral efficiency targets, but that multiple LCG profiles may be established for both grants. For example, a mix of service priorities could be controlled dynamically on a per-grant basis, such as where outer-loop service quality mechanisms are used.

In some embodiments, grant restrictions may affect LCP procedures during the TTIs when the grant is restricted for one or more LCGs. For example, restricted LCGs may not be able to schedule data regardless of their priority/PBR. In some embodiments, the restriction is applied to the entire LCG, so that it applies to all LCHs mapped to a given LCG, rather than on an LCH level. In certain embodiments, one or more LCHs with similar QoS may be grouped together by the base station, and thus may be restricted to all or no LCGs. In this manner, restrictions may only affect LCG scheduling, rather than scheduling within an LCG.

FIG. 3 illustrates an example of how a network entity fills a given grant using PBR/priority parameters associated to an LCG dynamically set on a per grant basis. Without the dynamic prioritization of certain LCGs, the network would have not control over the network entity scheduling, as illustrated in (i) "Legacy LCP," (ii) "Legacy LCP+Adjusted PBR," and (iii) "Legacy LCP+Adjusted Priority" In examples (i)-(ii), the network will more flexibly control how the network entity prioritizes the buffered data according to internal optimization criteria and/or QoS/QoE targets.

It would be beneficial for the network entity and base station to understand the different types of grants, as well as how the network entity should map its LCGs towards each grant type. In some embodiments, information may be extracted by the base station from the different logical channels. The configuration of grant types and LCG mapping rules may be configured by semi-static signaling via RRC signaling, dynamic signaling from allocation-to-allocation, or a combination of both.

In certain embodiments, an indication indicating why type of grant is provided to the network entity, as well as the allocated LCGs, may be configured semi-statically via RRC signaling. For example, certain TTIs may be used or reserved for certain types of uplink grants and/or corresponding LCG mapping rules. Dynamic scheduling may use a new PDCCH DCI format and/or re-define the interpretation of an existing PDCCH DCI format, in accordance with some embodiments.

The configuration of various uplink grant types, such as those depicted in FIG. 3, may be selected in advance by the network entity and base station. For example, the network entity may know which LCG mapping to apply for each received grant type, where each received grant type is associated with one or more LCG mapping rules. In certain embodiments, the configuration of the grant type and the associated LCG mapping rules is performed by the network, and should be configured by the network entity via explicit signaling.

Grant types, as well as mapping rules for how the LCGs may be mapped to different types of grants, may be configured in various methods. For example, semi-static signaling may be used to configure the grant types, such as that depicted in FIG. 3, which provides the network entity with RRC signaling from the base station, and/or applies for a predetermined period of time. By assigning a specific setup, the network entity would apply a certain mapping rule until a new reconfiguration message with a new grant and/or configuration of LCGs is received by the network entity.

Dynamic signaling may also be used, wherein the grant itself may provide information on the mapping for this particular physical resource allocation, and may change from allocation-to-allocation. The dynamic signaling may be implemented such that the network entity determines which mapping rule should be applied. In certain embodiments, a combination of semi-static signaling for some grants, and dynamic signaling for other grants, may be used. For example, semi-static signaling for grant type 0 may be used, while dynamic signaling for grant types 1 and 2 may be used.

FIG. 4 illustrates an example of a signal flow diagram according to certain embodiments. In step 401, network entity 410 may transmit a buffer status report to base station 420.

In step 403, base station 420 may transmit grants of uplink resources to network entity 410. In certain embodiments, the one or more grants of one or more uplink resources includes one or more physical resource allocation parameters containing one or more logical channel groups. In some embodiments, the one or more grants of one or more uplink resources may prioritize one or more logical channel groups. In certain embodiments, the plurality of resource physical resource allocation parameters corresponds to one or more services provided in the second network entity. The one or more grants are associated with one or more error rates, in accordance with some embodiments.

In step 405, network entity 410 may transmit data to base station 420 according to the received grants.

Figure 5:
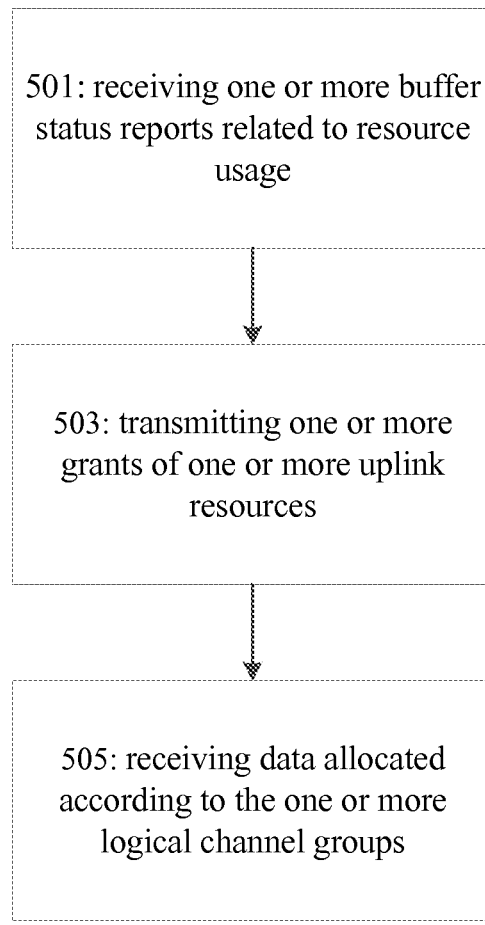
FIG. 5 illustrates an example of a method according to certain embodiments.

FIG. 5 illustrates an example method of a base station.

In step 501, a base station may receive one or more buffer status reports related to resource usage. In step 503, the base station may transmit one or more grants of one or more uplink resources to the network entity. In certain embodiments, the one or more grants of one or more uplink resources includes one or more physical resource allocation parameters containing one or more logical channel groups.

In some embodiments, the one or more grants of one or more uplink resources may prioritize one or more logical channel groups. In certain embodiments, the plurality of resource physical resource allocation parameters corresponds to one or more services provided in the second network entity. The one or more grants are associated with one or more error rates, in accordance with some embodiments. In step 505, the base station may receive data allocated according to the one or more logical channel groups.

Figure 6:
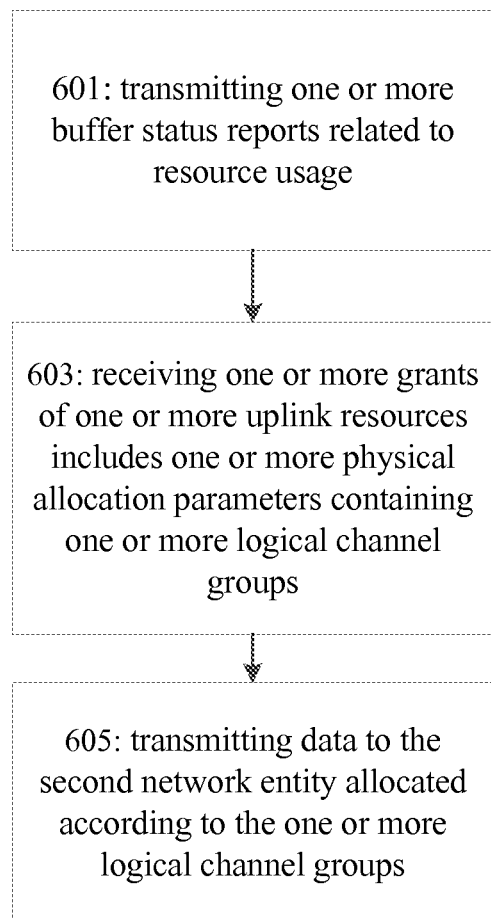
FIG. 6 illustrates an example of another method according to certain embodiments.

FIG. 6 illustrates another example method of a network entity. In certain embodiments, the network entity may be the same network entity as the network entity disclosed in FIG. 5.

In step 601, a network entity may transmit one or more buffer status reports related to resource usage. In step 603, the network entity may receive one or more grants of one or more uplink resources including one or more physical resource allocation parameters containing one or more logical channel groups.

In certain embodiments, the one or more grants of one or more uplink resources includes one or more physical resource allocation parameters containing one or more logical channel groups. In some embodiments, the one or more grants of one or more uplink resources may prioritize one or more logical channel groups. In certain embodiments, the plurality of resource physical resource allocation parameters corresponds to one or more services provided in the second network entity. The one or more grants are associated with one or more error rates, in accordance with some embodiments. In step 605, the network entity may transmit data to the base station according to the logical channel groups.

One having ordinary skill in the art will readily understand that certain embodiments discussed above may be practiced with steps in a different order, and/or with hardware elements in configurations, which are different from those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3 GPP 3rd Generation Partnership Project
5G 5th Generation
BE Best Effort
BLER Block Error Ratio
BS Base Station
BSR Buffer Status Report
DCI Downlink Channel Indicator
DRB Data Radio Bearer
eMBB Enhanced Mobile Broadband
eNB evolved Node B
HRLLC High-Reliability Low Latency Communications
IMS IP Multimedia Subsystem
LCG Logical Channel Group
LCH Logical Channel
LCP Logical Channel Prioritization
LTE Long-Term Evolution
MAC Medium Access Control
MBR Maximum Bit Rate
MCS Modulation and Coding Scheme
NR New Radio
PBR Prioritized Bit Rate
PDCCH Physical Downlink Control Channel
PDN Packet Data Network
PDU Protocol Data Unit
PHY Physical Layer
QAR Quadrature Amplitude Modulation
QCI Quality of Service Class Indicator
QoE Quality of Experience
QoS Quality of Service
RB Radio Bearer
RRC Radio Resource Control
SRB Signaling Bearer
TTI Transmission Time Interval
UE User Equipment
UL Uplink
URLLC Ultra-Reliable Low Latency Communications
VPN Virtual Private Network

We claim:

1. A base station, comprising:
at least one processor; and
at least one memory storing instructions that, when executed by the at least one processor, cause the base station at least to perform:
transmitting by the base station multiple grants of one or more uplink resources to a user equipment for the user equipment to use for one or more uplink transmissions to the base station, wherein the multiple grants of the one or more uplink resources are for the user equipment to use for the one or more uplink transmissions to the base station and comprise one or more physical resource allocation parameters available for one or more logical channels having given priorities and targeted for the multiple grants, wherein the transmitted multiple grants of the one or more uplink resources adjust priorities of the one or more logical channels, at least by imposing, dynamically at least on a per grant basis able to change from allocation-to-allocation of the multiple grants for the user equipment to use for the one or more uplink transmissions to the base station, one or more restrictions on the one or more logical channels, wherein the one or more logical channels transmitted by the user equipment have priorities different from their corresponding given priorities, wherein the one or more uplink resources for the multiple grants by the base station are selected from a set of available uplink resources; and receiving, by the base station, data from the user equipment on the one or more uplink resources allocated from the one or more logical channels that have the priorities different from their corresponding given priorities and based at least on the one or more physical resource allocation parameters.

2. The base station according to claim 1, wherein the multiple grants comprise one or more indications; or the multiple grants are based upon a primary logical channel; or the multiple grants comprise the one or more indications and are based upon the primary logical channel.

3. The base station according to claim 1, wherein the one or more restrictions comprise one or more of the following: one or more restrictions on one or more logical channels available for use, or restrictions on one or more logical channels that are unavailable for use.

4. The base station according to claim 3, wherein the one or more restrictions restrict use of the one or more uplink resources in the multiple grants.

5. The base station according to claim 3, wherein the one or more restrictions indicated for a certain logical channel are extended to one or more logical channels associated with the certain logical channel.

6. The base station according to claim 1, wherein one or more prioritized bit rates are adjusted based upon one or more of the following: the one or more logical channels in the multiple grants or the one or more logical channels that are associated with the multiple grants, wherein the adjusted one or more prioritized bit rates have priorities adjusted from their corresponding given priorities so data for the one or more prioritized bit rates are sent in an order different from an order based on their given priorities.

7. The base station according to claim 1, wherein the multiple grants are based upon one or more of the following: a buffer status report, status of a hybrid automatic repeat request, transmission power, or information related to a quality of service in one or more radio bearers, flows, or network slices associated with the one or more logical channels.

8. The base station according to claim 1, wherein the one or more physical resource allocation parameters are dedicated to one or more services provided to and/or requested in the base station and/or the user equipment.

9. An apparatus, comprising:
at least one processor; and
at least one memory storing instructions that, when executed by the at least one processor, cause the apparatus at least to perform:
receiving, at the apparatus from a base station, multiple grants of one or more uplink resources for a user equipment to use for uplink transmission to the base station, the multiple grants comprising one or more physical resource allocation parameters associated with one or more logical channels having given priorities and targeted for the multiple grants, wherein the received multiple grants of the one or more uplink resources are for the user equipment to use for uplink transmission to the base station and adjust priorities of the one or more logical channels, at least by imposing, dynamically at least on a per grant basis able to change from allocation-to-allocation of the multiple grants for the user equipment to use for uplink transmission to the base station, one or more restrictions on the one or more logical channels wherein the one or more logical channels transmitted by the apparatus have priorities different from their corresponding given priorities, wherein the one or more uplink resources for the multiple grants by the base station are selected from a set of available uplink resources; and transmitting data, by the apparatus to the base station, on the one or more uplink resources from the one or more logical channels that have priorities different from their corresponding given priorities and based at least on the physical resource allocation parameters, wherein the apparatus forms at least part of a user equipment.

10. The apparatus according to claim 9, wherein the at least one memory further store instructions that, when executed by the at least one processor, cause the apparatus at least to perform transmitting one or more buffer status reports associated with resource usage to the base station, and the resource usage is related to data buffered from one or more of the following: radio bearers, network flows, or network slices.

11. The apparatus according to claim 9, wherein the one or more physical resource allocation parameters are dedicated to one or more services provided in the base station.

12. The apparatus according to claim 9, wherein the multiple grants are associated with one or more performance metrics associated with the one or more logical channels, and wherein the one or more performance metrics comprise one or more of packet error rate levels, packet error rate ranges, latencies, or bit rates.

13. The apparatus according to claim 9, wherein the multiple grants comprise one or both of restrictions on one or more logical channels available for use, or restrictions on one or more logical channels unavailable for use.

14. The apparatus according to claim 9, wherein a prioritized bit rate is adjustable based upon a targeted logical channel.

15. A method, comprising:
receiving, by a user equipment from a base station, multiple grants of one or more uplink resources for a user equipment to use for uplink transmission to the base station, the multiple grants comprising one or more physical resource allocation parameters associated with one or more logical channels having given priorities and targeted for the multiple grants, wherein the received multiple one or more grants of the one or more uplink resources are for the user equipment to use for uplink transmission to the base station and adjust priorities of the one or more logical channels, at least by imposing, dynamically at least on a per grant basis able to change from allocation-to-allocation of the multiple grants for the user equipment to use for uplink transmission to the base station, one or more restrictions on the one or more logical channels wherein the one or more logical channels have priorities different from their corresponding given priorities, wherein the one or more uplink resources for the multiple grants by the base station are selected from a set of available uplink resources; and transmitting data, by the user equipment to the base station, on the one or more uplink resources from the one or more logical channels that have priorities different from their corresponding given priorities and based at least on the physical resource allocation parameters.

16. The apparatus according to claim 9, wherein a grant itself provides information on mapping for a corresponding physical resource allocation.

17. The apparatus according to claim 16, wherein the receiving multiple grants comprises receiving a combination of semi-static signaling for some grants, and dynamic signaling for other grants.

18. The base station according to claim 1, wherein the one or more restrictions on the one or more logical channels result in at least one logical channel that is not transmitted for a grant regardless of its corresponding given priority.

19. The base station according to claim 1, wherein the restrictions are different for logical channels within a set of a plurality of logical channels based on types of grants in the multiple grants.

20. The apparatus according to claim 9, wherein:
the one or more logical channels having given priorities and targeted for the multiple grants are a plurality of logical channels having corresponding given priorities;
the received multiple grants of the one or more uplink resources adjust priorities of the plurality of logical channels, at least by imposing, dynamically at least on a per grant basis able to change from allocation-to-allocation of the multiple grants, one or more restrictions on the plurality of logical channels wherein a given one of the plurality of logical channels transmitted by the apparatus has a priority different from its corresponding given priority; and
the transmitting data comprises transmitting the data on the one or more uplink resources from the plurality of logical channels wherein a given logical channel is transmitted using a priority different from its corresponding given priority while others of the plurality of logical channels are transmitted using their corresponding given priorities and based at least on the physical resource allocation parameters.

\* \* \* \* \*